(12) United States Patent
Wyatt

(10) Patent No.: US 7,160,094 B2
(45) Date of Patent: Jan. 9, 2007

(54) DIE ASSEMBLY

(75) Inventor: Mark Wyatt, Chino Hills, CA (US)

(73) Assignee: Avery Dennison Corporation, Pasadena, CA (US)

( * ) Notice: Subject to any disclaimer, the term of this patent is extended or adjusted under 35 U.S.C. 154(b) by 315 days.

(21) Appl. No.: 10/850,893

(22) Filed: May 21, 2004

(65) Prior Publication Data

US 2004/0247723 A1    Dec. 9, 2004

Related U.S. Application Data

(60) Provisional application No. 60/475,444, filed on Jun. 3, 2003.

(51) Int. Cl.
*B29C 47/16* (2006.01)

(52) U.S. Cl. .................... 425/141; 425/190; 425/381; 425/465; 425/466

(58) Field of Classification Search ............... 425/141, 425/190, 381, 465, 466
See application file for complete search history.

(56) References Cited

U.S. PATENT DOCUMENTS

| | | | | |
|---|---|---|---|---|
| 3,813,204 A | * | 5/1974 | Gregory | 425/466 |
| 3,883,279 A | | 5/1975 | Heyer | 425/141 |
| 3,940,221 A | * | 2/1976 | Nissel | 425/141 |
| 4,332,543 A | | 6/1982 | Fulton et al. | 425/461 |
| 4,454,084 A | * | 6/1984 | Smith et al. | 264/40.1 |
| 4,514,348 A | * | 4/1985 | Iguchi et al. | 264/40.1 |
| 4,517,145 A | * | 5/1985 | Knopf | 264/408 |
| 4,704,083 A | * | 11/1987 | Iguchi et al. | 425/466 |
| 4,726,752 A | | 2/1988 | VanDun | 425/141 |
| 4,765,941 A | * | 8/1988 | Anthony et al. | 264/40.1 |
| 4,781,562 A | * | 11/1988 | Sano et al. | 425/141 |
| 4,854,844 A | * | 8/1989 | Carlsen | 425/141 |
| 4,882,104 A | | 11/1989 | Dobrowsky | 264/40.1 |
| 4,990,079 A | * | 2/1991 | Lorenz | 425/141 |
| 4,994,976 A | | 2/1991 | Akasaka | 364/473 |

(Continued)

FOREIGN PATENT DOCUMENTS

DE    101 19 633 A1    10/2002

(Continued)

OTHER PUBLICATIONS

PCT/US2004/016311; PCT International Search Report mailed Oct. 13, 2004.

*Primary Examiner*—Joseph S. Del Sole
(74) *Attorney, Agent, or Firm*—Renner, Otto, Boisselle & Sklar, LLP

(57) ABSTRACT

A die assembly (10) having a first die part (12), which includes a first lip (16) that, in combination with a second lip (18), defines a feed gap (20). The first die part (12) also includes a rear portion (22), a front portion (24), a slot (26) between these portions (22,24), and a gap-setting device (28) that is mechanically movable within the slot (26) so as to enable the movement of the front portion (24) relative to the rear portion (22). The first lip (16) is carried by the front portion (24), whereby movement of the front portion (24) in one direction moves the first lip (16) relative to the second lip (18), thereby adjusting the feed gap (20). The geometries of the slot (26) and the gap-setting device (28) are such that movement in a second opposite direction is limited to a known position, thereby providing a registration position for the front portion (24) of the first die part (12) and thereby providing a registration position for the first lip (16).

21 Claims, 6 Drawing Sheets

U.S. PATENT DOCUMENTS

| | | | |
|---|---|---|---|
| 5,020,984 A * | 6/1991 | Cloeren et al. | 425/141 |
| 5,051,082 A * | 9/1991 | Hattori et al. | 425/141 |
| 5,116,211 A | 5/1992 | Shinmoto | 425/141 |
| 5,116,554 A | 5/1992 | Shinmoto | 264/40.1 |
| 5,126,947 A | 6/1992 | Koyama | 364/469 |
| 5,259,747 A * | 11/1993 | Cloeren | 425/141 |
| 5,382,146 A | 1/1995 | Kruger et al. | 425/141 |
| 5,423,668 A * | 6/1995 | Cloeren | 425/141 |
| 5,425,911 A * | 6/1995 | Tomic et al. | 264/173.12 |
| 5,464,577 A * | 11/1995 | Leonard et al. | 264/40.5 |
| 5,567,369 A | 10/1996 | Beckwith | 264/40.1 |
| 5,761,066 A | 6/1998 | Lettau et al. | 364/472.12 |
| 5,770,129 A * | 6/1998 | Monti | 264/40.1 |
| 5,888,556 A * | 3/1999 | Cloeren et al. | 425/141 |
| 6,017,207 A * | 1/2000 | Druschel | 425/141 |
| 6,019,024 A * | 2/2000 | Robinson et al. | 89/1.42 |
| 6,039,904 A | 3/2000 | Nitta et al. | 264/40.5 |
| 6,065,953 A | 5/2000 | Bentivoglio | 425/143 |
| 6,106,671 A | 8/2000 | Heaven et al. | 162/198 |
| 6,152,720 A | 11/2000 | Greb et al. | 425/147 |
| 6,273,701 B1 * | 8/2001 | Moriarity | 425/141 |
| 6,482,339 B1 | 11/2002 | Greb et al. | 264/40.7 |
| 6,495,196 B1 * | 12/2002 | Innes et al. | 427/8 |
| 6,663,375 B1 * | 12/2003 | Ulcej | 425/141 |
| 6,799,961 B1 * | 10/2004 | Freynhofer et al. | 425/141 |

FOREIGN PATENT DOCUMENTS

| | | |
|---|---|---|
| FR | 1 417 832 | 11/1965 |

\* cited by examiner

DIE ASSEMBLY

RELATED APPLICATION

This application claims priority under 35 U.S.C. §119(e) to U.S. Provisional Application No. 60/475,444 filed on Jun. 3, 2003. The entire disclosure of this earlier application is hereby incorporated by reference.

FIELD OF THE INVENTION

This invention relates generally, as indicated, to a die assembly and, more particularly, to a die assembly with a device to adjust the thickness of the feed gap.

BACKGROUND OF THE INVENTION

A die assembly can be modular and, in any event, is typically assembled from a plurality of parts and then set in a die station as an integral device. For example, a die assembly can comprise a first die part and a second die part, which together form the components that allow the fluid to enter the assembly and be properly emitted therefrom. The first die part includes a first lip and the second die part includes a second lip, these lips defining a feed gap therebetween that determines the thickness of the fluid film emitted therefrom.

A die assembly can have a fixed feed gap or a flexible feed gap. With a fixed feed gap, the lips are not movable relative to each other, whereby the thickness of the feed gap will always be of the same known dimension. With a flexible feed gap, one lip is movable relative to the other lip so as to enable the adjustment of the feed gap along the width of the assembly. A flexible feed gap is typically accomplished by assembling the first die part so that it contains a flexible web between its rear portion and its front portion (to which the first lip is attached), as well as means for moving the front portion in localized areas. Movement of the front portion results in the adjustment of the position of the lip relative to the other lip and, thus, the thickness of the feed gap in the relevant localized area.

In flexible feed gap operations, localized adjustments of the feed gap can usually be accomplished with conventional die assembly designs in order to accommodate a particular run. However, once initial adjustments are made (i.e., once the movable lip is moved from its original adjustment), returning the lip to a known position is not so easily done, if it is even possible. Also, without a clean die and specialized equipment, it is impossible to adjust a feed gap on an industry standard flex die to a known precision gap opening.

SUMMARY OF THE INVENTION

The present invention provides a die assembly, which can be easily adjusted to a known precision gap opening by returning a movable lip to a known registration position.

More particularly, the present invention provides a die assembly comprising a first die part and a second die part, which together form components that allow a fluid to enter the assembly and be properly emitted therefrom. The first die part includes a first lip and the second die part includes a second lip, these lips defining a feed gap therebetween that determines the thickness of the fluid emitted therefrom. The first die part also includes a rear portion, a front portion, a slot between the rear portion and the front portion, and a gap-setting device mechanically movable within the slot for movement of the front portion relative to the rear portion. The first lip is carried by the front portion, whereby movement of the front portion in one direction moves the first lip relative to the second lip, thereby adjusting the feed gap. The geometries of the slot and the gap-setting device are such that movement in a second direction, opposite the first direction, is limited to a known position, thereby providing a registration position for the front portion of the first die part and thereby providing a registration position for the first lip.

These and other features of the invention are fully described and particularly pointed out in the claims. The following description and drawings set forth in detail certain illustrative embodiments of the invention, which are indicative of but a few of the various ways in which the principles of the invention may be employed.

DRAWINGS

DETAILED DESCRIPTION

Figure 1:
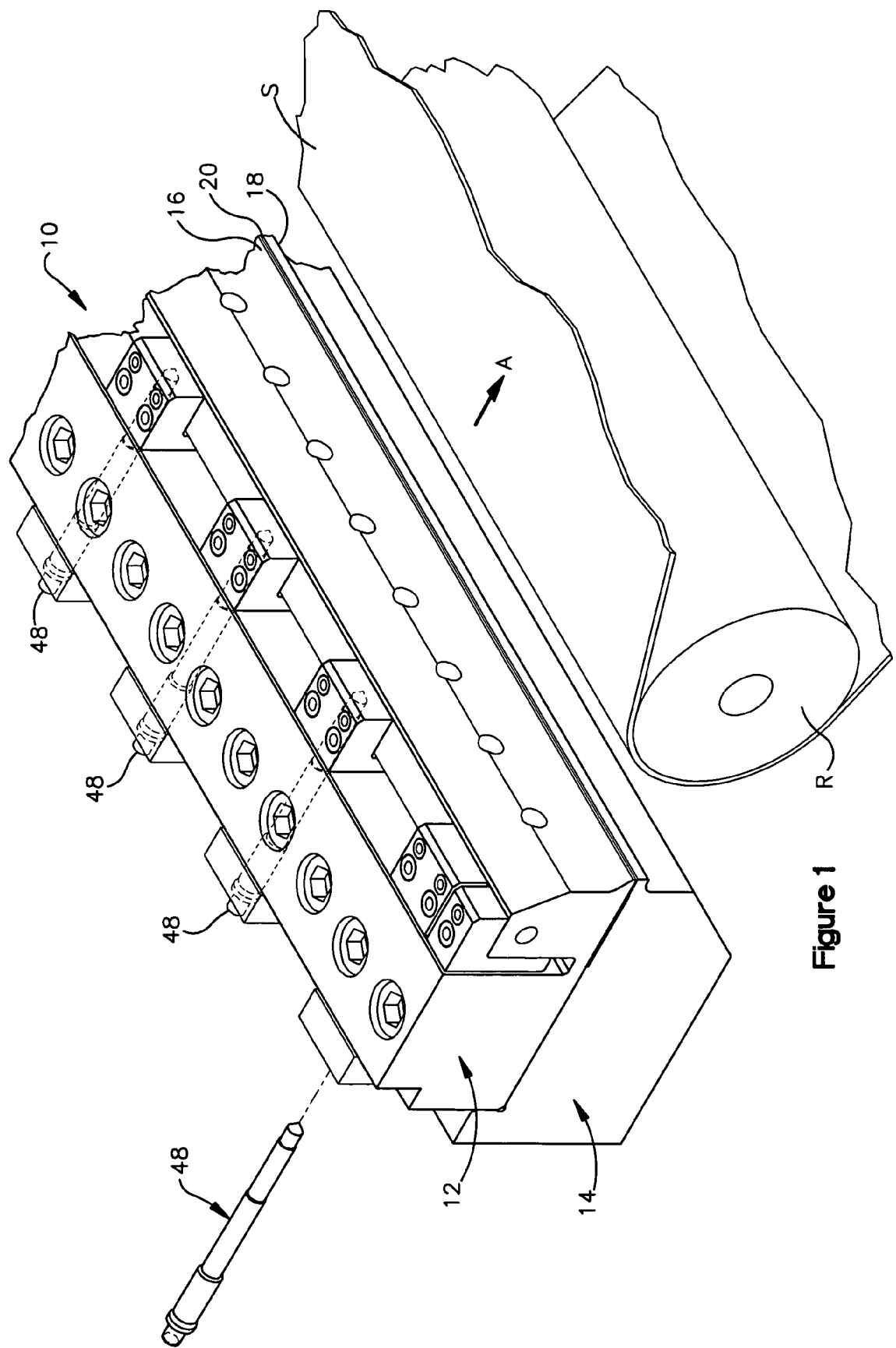
FIG. 1 is a schematic illustration of a die assembly according to the present invention.

Referring now to the drawings, and initially to FIG. 1, a die assembly 10 according to the present invention is shown. The illustrated assembly 10 is a slot die assembly and is shown in position to coat a substrate S traveling in the direction of arrow A around a roll R. The die assembly 10 and the substrate S typically will have substantially equal widths, whereby the entire width of the substrate S can be coated in one pass. The die assembly 10 could instead be any slot die, a curtain die, an extrusion die or any other device wherein control of the feed gap is necessary or desired. Additionally or alternatively, a multi-layer die (forming multiple feed gaps) is also possible with, and contemplated by, the present invention. Specifically, the one or more of the feed gaps in such a die assembly could be made flexible via this invention.

The die assembly 10 can be modular so that it can be assembled from a plurality of parts and then set in a die station as an integral device. In the illustrated embodiment, the die assembly 10 comprises a first (upper) die part 12 and a second (lower) die part 14. (An assembly having more die parts can, of course, be used instead.) The die parts together form the conventional components of a die assembly, allowing the fluid to enter the assembly and be properly emitted therefrom. The first die part 12 includes a first lip 16 and the second die part 14 includes a second lip 18. The lips 16 and 18 define a feed gap 20 therebetween that determines the thickness of the fluid emitted therefrom. (This is shown more clearly in FIG. 3.)

Figure 2:
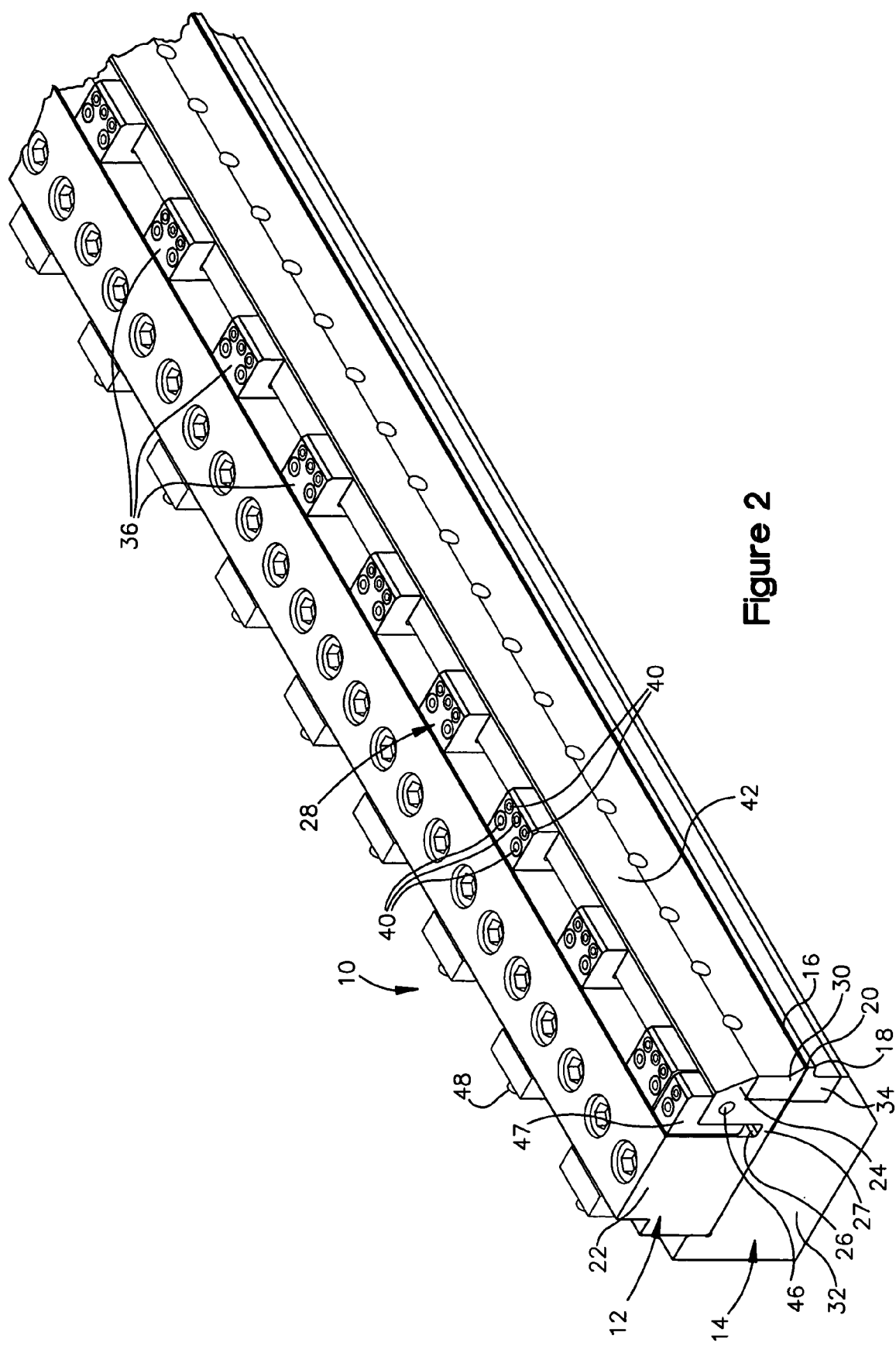
FIG. 2 is a perspective view of the die assembly.

Referring now to FIG. 2, the die assembly 10 is illustrated in more detail. As shown, the first die part 12 includes a rear portion 22, a front portion 24, a slot 26 between the portions 22 and 24, a flexible web 27 that is formed below the slot 26, and a gap-setting device 28 positioned within the slot 26.

The rear portion 22 and the front portion 24 can be integrally formed (as shown) or can comprise different components assembled together. In the illustrated embodiment, the first die part 12 includes a lip element 30 (which contains the lip 16) secured to the front portion 24. The use of such a separate lip element allows easy replacement repair; however, that being said, a lip integrally formed with the front portion 24 could be used instead. Fasteners (e.g., bolts, not shown) can be used to secure the lip element 30 to the front portion 24.

The second die part 14 includes a main body portion 32 and a lip element 34 (containing the lip 18) secured thereto. In the illustrated embodiment, the second lip 18 remains stationary and only the first lip 16 is moved to adjust the feed gap. However, assemblies wherein both lips are movable is certainly possible with, and contemplated by, the present invention. For example, the second die part 14 could be designed to also include the flex-allowing components of the first die part 12 or any components that would allow selective movement of the lip 18.

The gap-setting device 28 comprises a plurality of gap-setting elements 36, each of which is mechanically movable within the slot 26 to move the front portion 24 at corresponding localized areas. The first lip 16 is carried by the front portion 24 (via the lip element 30 in the illustrated embodiment), whereby movement of the front portion 24 moves the first lip 16 relative to the second lip 18, thereby adjusting the feed gap 20. As explained in more detail below, the geometries of the slot 26 and the gap-setting device 28 are such that movement in a second direction, opposite the first direction, is limited to a known position. This provides a registration position for the front portion 24 of the first die part 12, and thereby provides a registration position for the first lip 16 and, ultimately, a registration for a known feed gap thickness.

Figure 3:
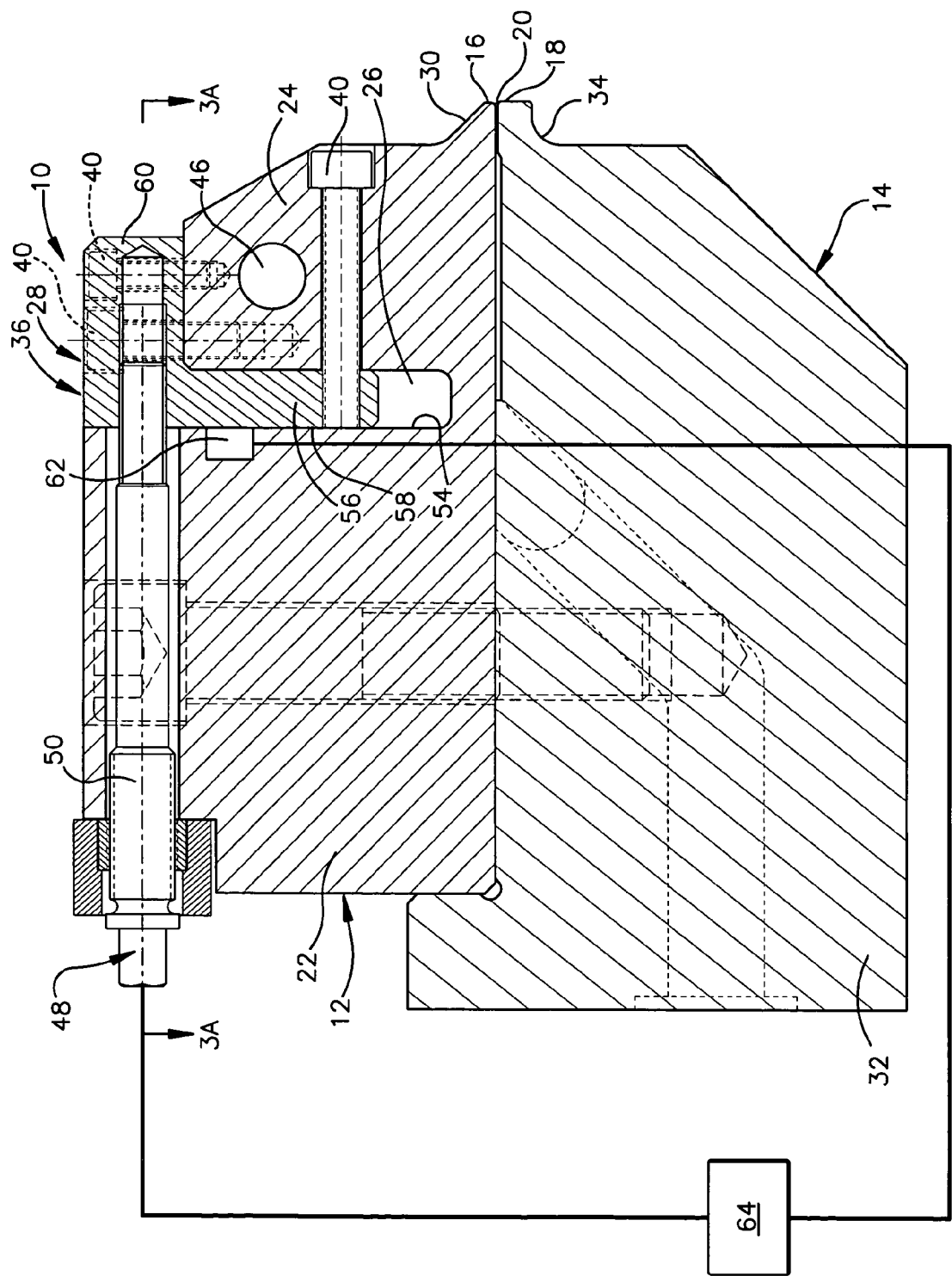
FIG. 3 is a close-up side view, partially in section, of the first and second die parts.
Figure 3A:
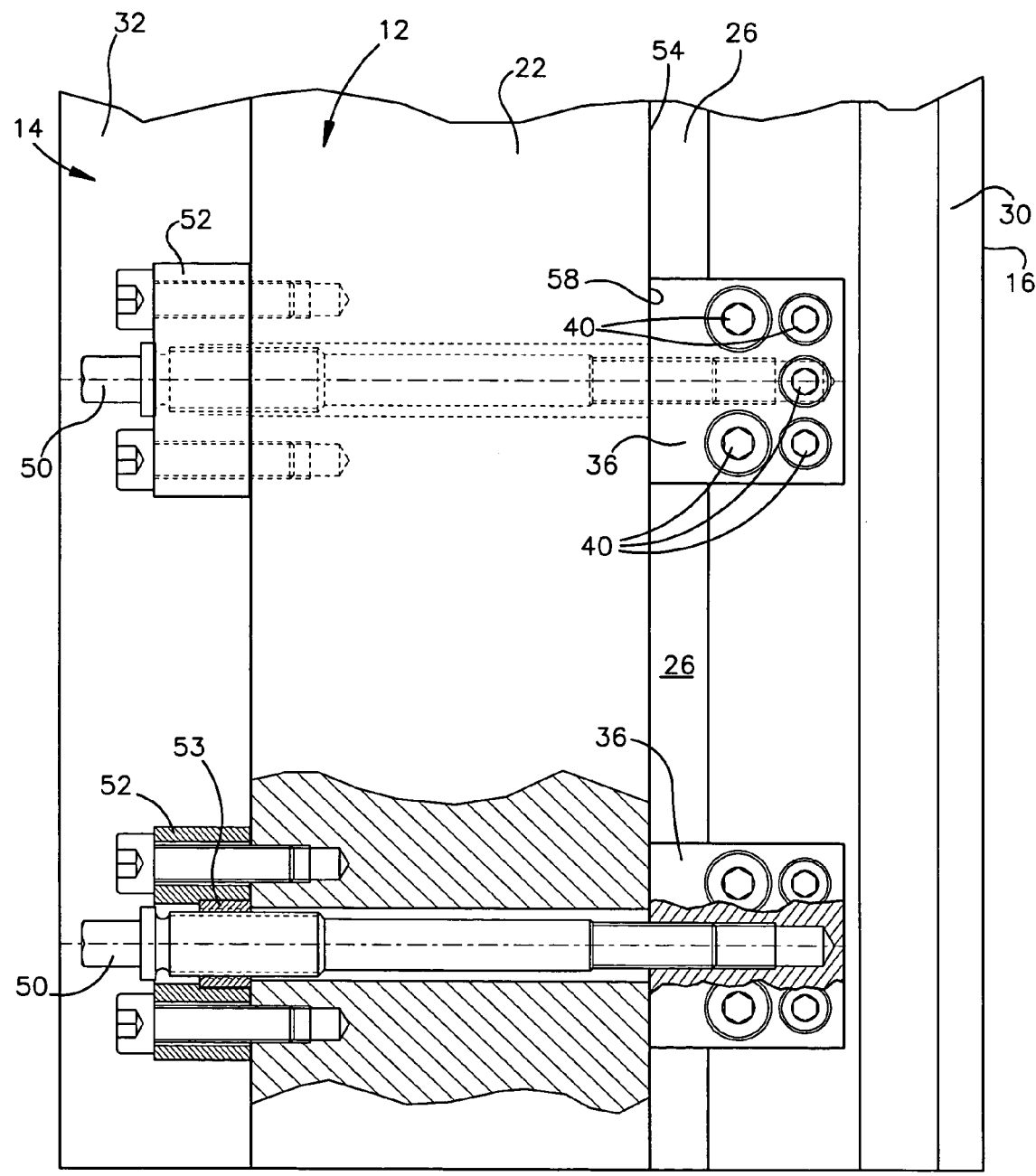
FIG. 3A is a sectional view of the first die part as seen along line 3A—3A in FIG. 3.

Referring now to FIGS. 3 and 3A, the first die part 12 and the second die part 14 are shown in detail. Fasteners 40 (e.g., bolts) are used to secure the gap-setting element 36 to the front portion 24. If the die assembly 10 is designed to accommodate heated die operations (e.g., hot melt), the die part 12 could also include a cartridge heater (not shown) within its rear portion 22, a longitudinal heater 46 within its front portion 24, and/or additional auxiliary heaters. (For example, as can be seen by referring briefly back to FIG. 2, auxiliary heaters 47 in a form resembling the shape of gap-setting element 36 could be placed at each end of the slot 26.) For non-heated operations (e.g., room temperature operations), such heaters would not be necessary. In any event, if heating is necessary, the rear portion 22 and the front portion 24 can be heated using electrical resistance heaters, oil, steam, water, etc. It may be noted that the illustrated front portion 24 is well suited to accept a longitudinal bore capable of having a tubular heater inserted, or allowing the passage of oil, water, steam, etc.

Movement of the gap-setting device 28 is caused by motion-causing means 48, which can be any mechanical, electrical, magnetic, or other motivation that accomplishes controlled movement. Preferably, each gap-setting element 36 has its own means 48 so that localized adjustments of the feed gap 20 are possible. In the illustrated embodiment, the motion-causing means 48 comprise a bolt 50, which extends rotatably through the rear portion 22 and a nut 52. The bolt 50 is threadably mated with the gap-setting element 36 on one end and is threadably mated with the nut 52 on its opposite end. When the bolt 50 is turned in one direction (e.g., clockwise), the front portion 24 is moved in a first direction, and when the bolt 50 is turned in an opposite direction (e.g., counter-clockwise), the front portion 24 moves in a second direction. The bolt 50 has differently pitched threads so that it can be placed in tension or compression, depending upon the desired direction of movement. A retainer 53 is provided to restrain rotation of the nut 52 during rotation of the bolt 50 (see FIG. 3A).

As is best seen by referring collectively to FIGS. 2 and 3, the slot 26 is defined by a series of slot-defining surfaces, which define a roughly rectangular-shaped cavity. One surface, surface 54, is oriented adjacent to the rear portion 22 and is substantially perpendicular to the plane of the fluid flow direction. The gap-setting elements 36 each have a roughly block-shaped portion 56, and one of the walls of block 56, wall 58, abuts precisely against the slot-defining surface 54 to limit movement in the second direction once the registration position is reached. The illustrated elements 36 also include a leg portion 60 extending perpendicularly outward from the block-shaped portion 56 to form a generally L-shaped element.

Figure 4:
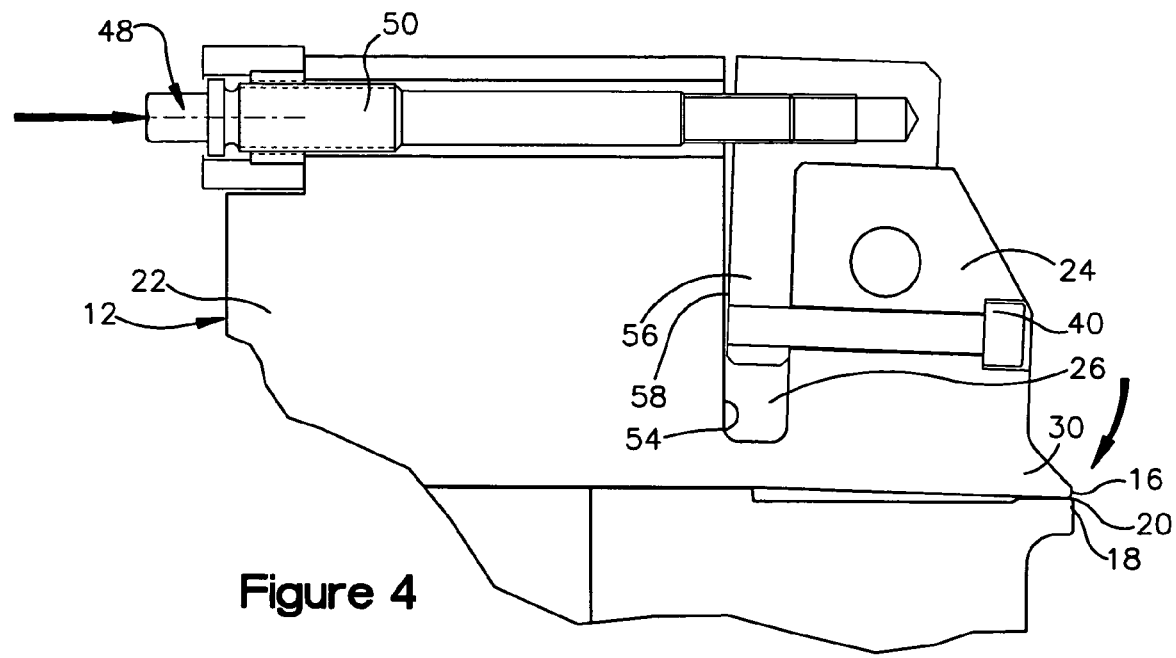
FIG. 4 is a schematic view of the interaction between certain components of the first die part.

Referring now collectively to FIG. 3 and FIG. 4, the interaction between the front portion 24, the slot 26, the gap-setting element 36, and the bolt 50 is schematically (and exaggeratedly) shown. When the bolt 50 is retracted (tensioned), the block's wall 58 is abutted precisely against the slot-defining surface 54, and the front portion 24 is positioned so that the first lip 16 is in a registration position defining a known thickness for the feed gap 20. (FIG. 3.) When the bolt 50 is extended (compressed), the block portion 56 pushes the front portion 24 downward, thereby decreasing the distance between the first lip 16 and the second lip 18 and reducing the thickness of the feed gap 20. (FIG. 4.) Upon subsequent retraction of the bolt 50, the front portion 24 returns to the position shown in FIG. 3, and the registration position is re-instated.

Thus, in flexible feed gap operations, localized adjustments of the feed gap 20 can be accomplished to accommodate a particular run. Additionally, once these adjustments are made, the front portion 24 can be returned to a known registration position. In this manner, the die assembly 10 can be used for a fixed feed gap operation and/or can have a known starting point when adjustments must be made for a subsequent flexible feed gap operation. It may be noted again that conventional flex-die assemblies cannot accommodate fixed feed gap operations.

Referring now back to FIG. 3, the die assembly 10 of the present invention may further comprise a sensor 62, which senses the position of the gap-setting element 36. The sensor 62 can comprise a mechanical, optical, inductive, capacitative and/or another suitable proximity-sensing component that is able to sense the distance between the slot's stop surface 54 and the rear wall 58 of the gap setting element 36. This sensed distance can be correlated to the thickness of the feed gap 20. (The die part 12 can be designed and the sensor 62 positioned so that there is a one-to-one correlation between the sensed distance and the thickness of the feed gap 20.) A controller 64 can be provided which, based on the sensed position, automatically sets a specified feed gap 20 in a corresponding localized area. The controller 64 can also control the motion-causing means in feedback to a sensor measuring coating thickness, coatweight, mass, etc. with the preferable cascading of the feed gap control to the coating thickness, coatweight, or mass, etc. control in order to adjust uniformity, coating thickness, mass, etc.

Figure 5:
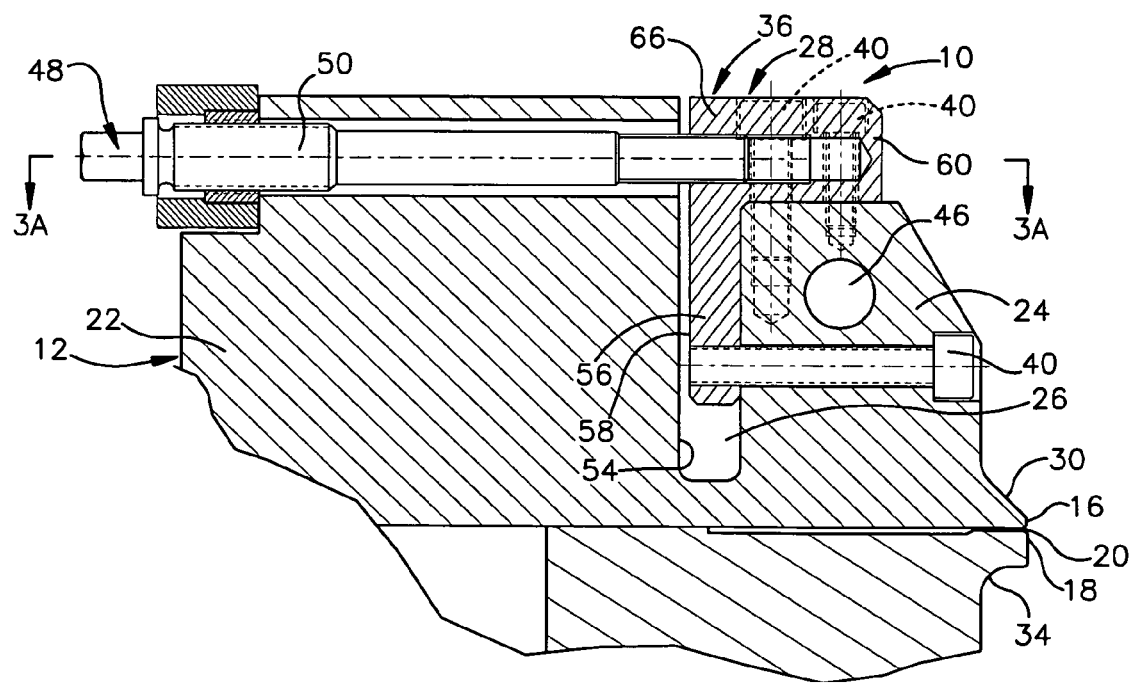
FIG. 5 is a view similar to FIG. 3, with a modified gap-setting device.

Referring now to FIG. 5, the first die part 12 is shown with a replacement gap-setting element 36. The element 36 is also mechanically movable within the slot 26 to move the front portion 24, but has a geometry such that movement in the second direction is not so limited. In this manner, the precision gap-setting element(s) 36 can be replaced with the gap-setting element(s) 36 to convert the die assembly 10 into a mode suitable for a conventional flexible feed gap operation.

Figure 6:
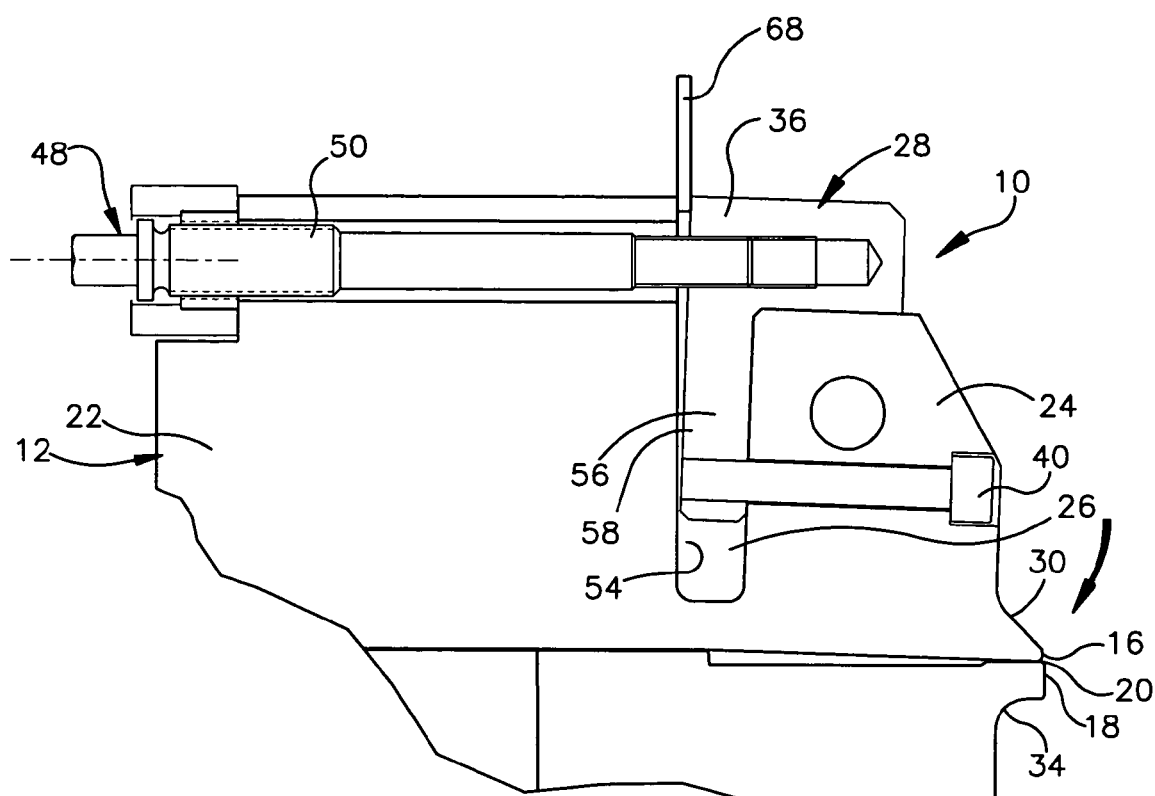
FIG. 6 is a view similar to FIG. 3, with another modified gap-setting device.

Referring now to FIG. 6, an additional or alternative conversion of the die assembly 10 is schematically shown. In this conversion, a spacer 68 is positioned between the gap-setting element 36 and one of the slot-defining surfaces (the surface 54 in the illustrated embodiment). The spacer 68 is sized/shaped to provide (in combination with the gap-setting element 36) a known feed gap thickness less than that acquired in the registration position, in effect creating a precise secondary registration position. A series of spacers 68 of different dimensions can be provided to allow a variety of different feed gap thicknesses to be achieved.

Although in the illustrated embodiment, the spacer 68 takes the form of simple shim fitted between the slot-defining surface 54 and the block's wall 58, other arrangements are possible with, and contemplated by, the present invention. For example, a groove could be formed (e.g., an upside-down U shaped groove milled around the edges and/or central groove) in one of the slot-defining surfaces and/or the gap-setting device 28. The spacer(s) 68 could be sized and shaped to fit within such a groove to provide the desired feed gap dimension. If the spacer 68 fit entirely within the groove, this would result in the feed gap dimension being the same as if only the gap-setting device 28 was used. If the spacer 68 protruded from the groove, this would define a different (smaller) feed gap dimension.

The setting of the spacer 68 can be achieved by moving the gap-setting element 36 in the first direction to a position that provides clearance between it and the adjacent slot-defining surface 54, inserting the spacer 68 into the clearance and then moving the gap-setting element 36 in the second direction in order to accurately set the feed gap 20. Alternatively, a thinner or thicker gap setting element 36 could be fabricated so as to create secondary registration positions of greater or lesser feed gap thickness.

Although the invention has been shown and described with respect to certain preferred embodiments, it is evident that equivalent and obvious alterations and modifications will occur to others skilled in the art upon the reading and understanding of this specification. The present invention includes all such alterations and modifications, and is limited only by the scope of the following claims.

The invention claimed is:

1. A die assembly, comprising a first die part and a second die part, which together form components that allow a fluid to enter the assembly and be properly emitted therefrom;
   the first die part including a first lip and the second die part including a second lip, these lips defining a feed gap therebetween that determines the thickness of the fluid emitted therefrom;
   the first die part also including a rear portion, a front portion, a slot between the rear portion and the front portion, and a gap-setting device mechanically movable within the slot, thereby enabling movement of the front portion relative to the rear portion;
   the first lip being carried by the front portion, whereby movement of the front portion in one direction moves the first lip relative to the second lip, thereby adjusting the feed gap; and
   wherein the geometries of the slot and the gap-setting device are such that movement in a second direction, opposite the first direction, is limited to a known position, thereby providing a registration position for the front portion of the first die part and thereby providing a registration position for the first lip.

2. A die assembly as set forth in claim 1, wherein the slot is defined by a series of slot-defining surfaces and wherein the gap-setting device abuts precisely against one of the slot-defining surfaces so as to stop movement in the second direction.

3. A die assembly as set forth in claim 1, wherein the gap-setting device comprises a plurality of gap-setting elements positioned along the width of the feed gap and wherein each gap-setting element can be mechanically moved independently of other gap-setting elements within the slot, thereby enabling movement of the front portion at one location.

4. A die assembly as set forth in the claim 3, wherein the gap-setting elements are secured to the front portion.

5. A die assembly as set forth in claim 3, wherein the slot is defined by a series of slot-defining surfaces, and each of the gap-setting elements has a series of walls defining its shape, and wherein one wall of the gap-setting member abuts precisely against one of the slot-defining surfaces so as to limit movement in the second direction whereby this slot-defining surface is a slot-defining stop surface.

6. A die assembly as set forth in claim 5, wherein the slot-defining stop surface is located adjacent to the rear portion.

7. A die assembly as set forth in claim 6, wherein movement of the front portion is caused by motion-causing means, each gap-setting element having its own motion-causing means.

8. A die assembly as set forth in claim 7, wherein the motion-causing means comprise a bolt which, when turned in one direction, moves the front portion in the first direction and, when turned in an opposite direction, moves the front portion in the second direction.

9. A die assembly as set forth in claim 8, wherein the bolt extends rotatably through the rear portion.

10. A die assembly as set forth in claim 6, wherein the slot-defining stop surface is oriented substantially perpendicular to the plane of fluid flow direction.

11. A die assembly as set forth in claim 3, wherein the slot-defining surfaces define a roughly rectangular-shaped cavity and wherein each of the gap-setting elements has a roughly block-shaped portion.

12. A die assembly as set forth in claim 11, wherein each of the gap-setting elements has a leg portion extending perpendicularly outward from the block-shaped portion to form a generally L-shaped element.

13. A die assembly as set forth in claim 1, wherein the second lip remains stationary.

14. A die assembly as set forth in claim 1, further comprising a sensor that senses the position of the gap-setting device, whereby the thickness of the feed gap can be determined.

15. A die assembly as set forth claim 14, wherein the sensor senses the distance of the gap-setting device relative to a slot-defining surface.

16. A die assembly as set forth in claim 15, wherein each gap-setting element comprises a sensor for sensing its position.

17. A die assembly as set forth in claim 14, wherein a controller controls the motion-causing means, based on the sensed position, to set a feed gap in the corresponding localized area.

18. A die assembly as set forth in claim 1, further comprising a replacement gap-setting device, which is mechanically movable within the slot to move the front portion and which has a geometry such that movement in the second direction is not limited to the known position, whereby the gap-setting device having its movement in the second direction limited to the known position, can be replaced with this replacement gap-setting device, thereby converting the die assembly to a dual-movement die assembly.

19. A die assembly, comprising a first die part and a second die part, which together form components that allow a fluid to enter the assembly and be properly emitted therefrom:

the first die part including a first lip and the second die part including a second lip, these lips defining a feed gap therebetween that determines the thickness of the fluid emitted therefrom;

the first die part also including a rear portion, a front portion, a slot between the rear portion and the front portion, and a gap-setting device mechanically movable within the slot, thereby enabling movement of the front portion relative to the rear portion;

the first lip being carried by the front portion, whereby movement of the front portion in one direction moves the first lip relative to the second lip, thereby adjusting the feed gap;

wherein the geometries of the slot and the gap-setting device are such that movement in a second direction, opposite the first direction, is limited to a known position, thereby providing a registration position for the front portion of the first die part and thereby providing a registration position for the first lip;

the die assembly further comprising a spacer of a known thickness, which is positionable between one of the slot-defining walls and the gap-setting device, to position the front portion in a known position so as to acquire a known feed gap.

20. A die assembly as set forth in claim 19, comprising a series of such spacers, at least some of which may be of different thicknesses in order to provide different known distances of movement of the front portion.

21. A die assembly, comprising a first die part and a second die part, which together form components that allow a fluid to enter the assembly and be properly emitted therefrom;

the first die part including a first lip and the second die part including a second lip, these lips defining a feed gap therebetween that determines the thickness of the fluid emitted therefrom;

the first die part also including a rear portion, a front portion, and a flexible web between the rear portion and the front portion that allows the front portion to be pivoted relative to the rear portion;

the first lip being carried by the front portion, whereby movement of the front portion in one direction moves the first lip relative to the second lip, thereby adjusting the feed gap; and wherein movement of the front portion in an opposite direction sets the first portion in a position corresponding to a known thickness for the feed gap.

* * * * *